United States Patent [19]

Kazaoka et al.

[11] Patent Number: 4,502,730
[45] Date of Patent: Mar. 5, 1985

[54] FIXED-ANGLE ADJUSTING MECHANISM

[75] Inventors: Kenichi Kazaoka, Nagoya; Hiroshi Okazaki, Toyota, both of Japan

[73] Assignee: Aisin Seiki Kabushiki Kaisha, Kariya, Japan

[21] Appl. No.: 497,874

[22] Filed: May 25, 1983

[30] Foreign Application Priority Data

Jun. 8, 1982 [JP] Japan ................. 57-099018

[51] Int. Cl.³ ............................................ A47C 1/025
[52] U.S. Cl. ................................... 297/366; 297/367; 297/379
[58] Field of Search ............... 297/357, 366, 367, 368, 297/369, 379

[56] References Cited

U.S. PATENT DOCUMENTS

| | | | |
|---|---|---|---|
| 3,840,268 | 10/1974 | Johndrow et al. | 297/366 |
| 3,931,996 | 1/1976 | Yoshimura | 297/366 |
| 3,953,069 | 4/1976 | Tamura et al. | 297/367 |
| 4,269,447 | 5/1981 | Dottori | 297/367 X |

FOREIGN PATENT DOCUMENTS 1330533 9/1973 United Kingdom ................ 297/357

Primary Examiner—Francis K. Zugel
Assistant Examiner—Peter R. Brown
Attorney, Agent, or Firm—Finnegan, Henderson, Farabow, Garrett & Dunner

[57] ABSTRACT

A fixed-angle adjusting mechanism for use in an automobile seat assembly, for example, comprises a fixed member having a latch member, a movable member angularly movably mounted on the fixed member and having a pawl member engageable with the latch member in a desired angular position, a control lever angularly movably mounted on the fixed member and actuatable for disengaging the pawl member from the latch member, a memory member engageable with the latch member in response to actuation of the control lever, a limiting member angularly movably mounted on the fixed member, and engageable with the pawl member for preventing the latter from engaging the latch member in response to actuation of the control lever and responsive to coaction with the memory member for disengaging from the pawl member, and means acting on the memory member for positioning the latter in an angular position corresponding to the desired angular position.

6 Claims, 8 Drawing Figures

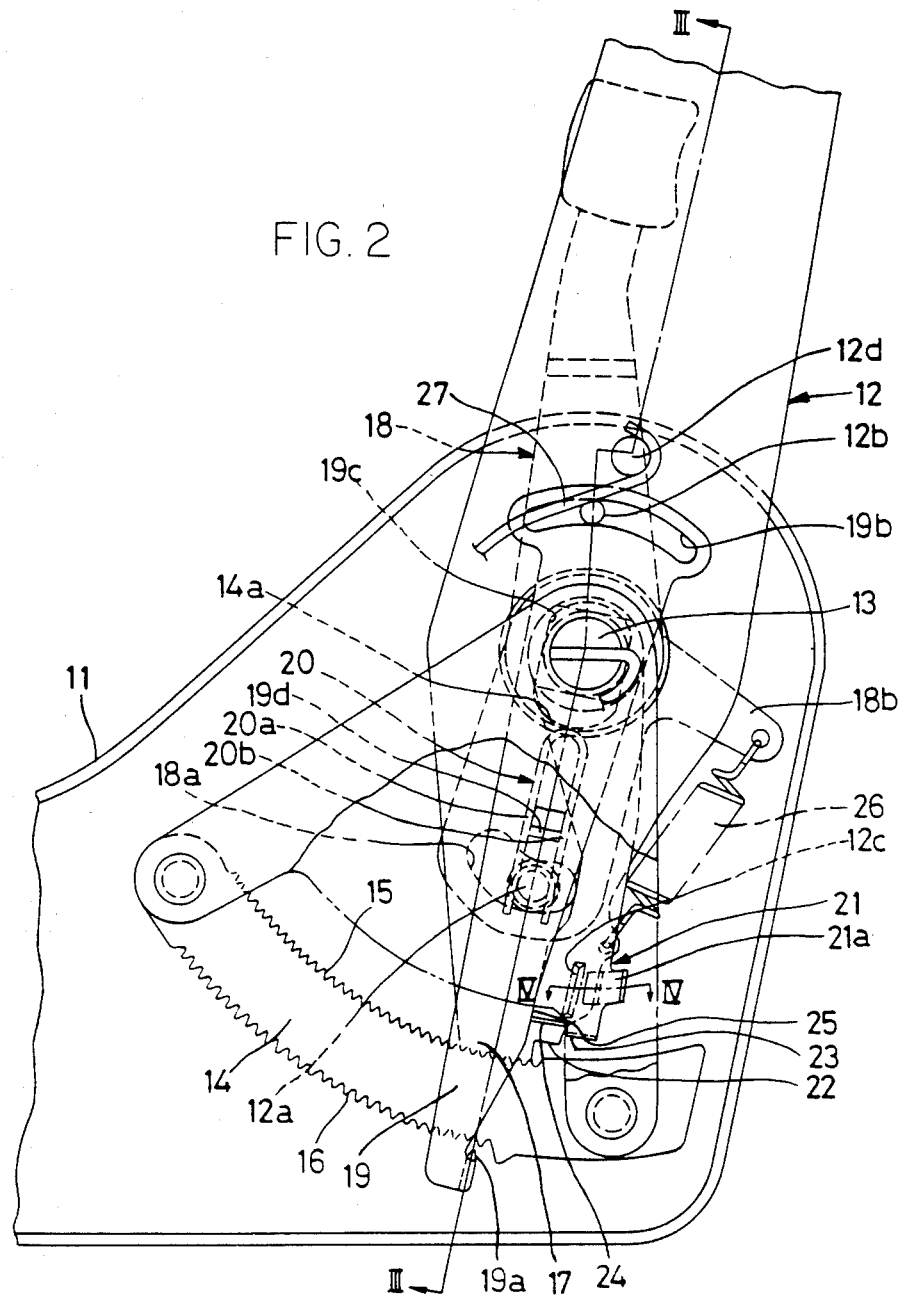

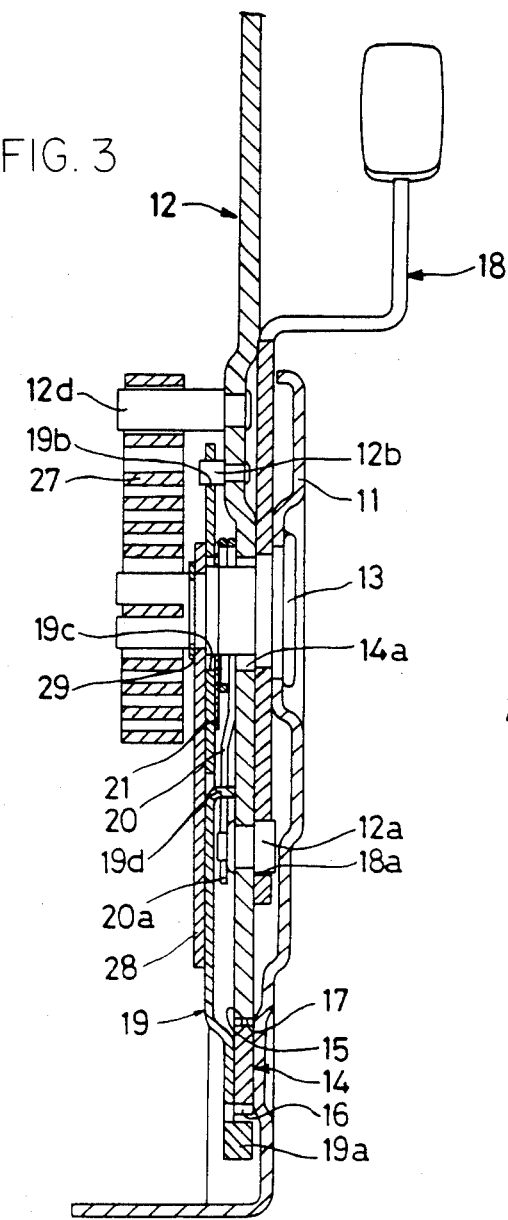
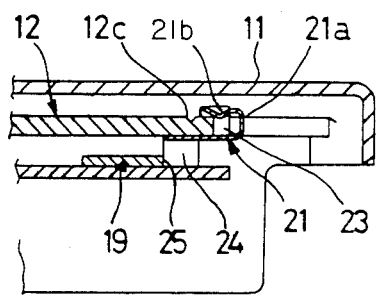

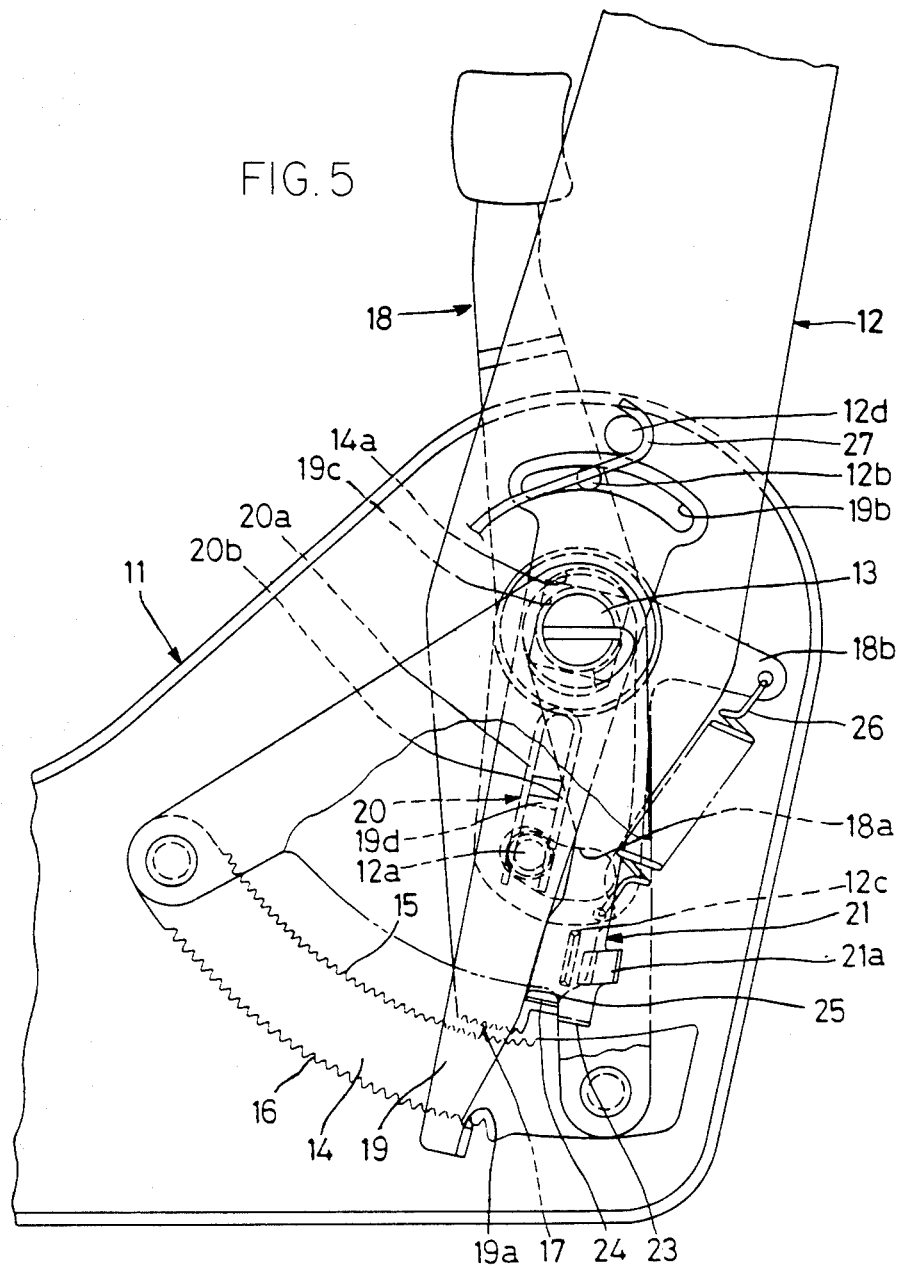

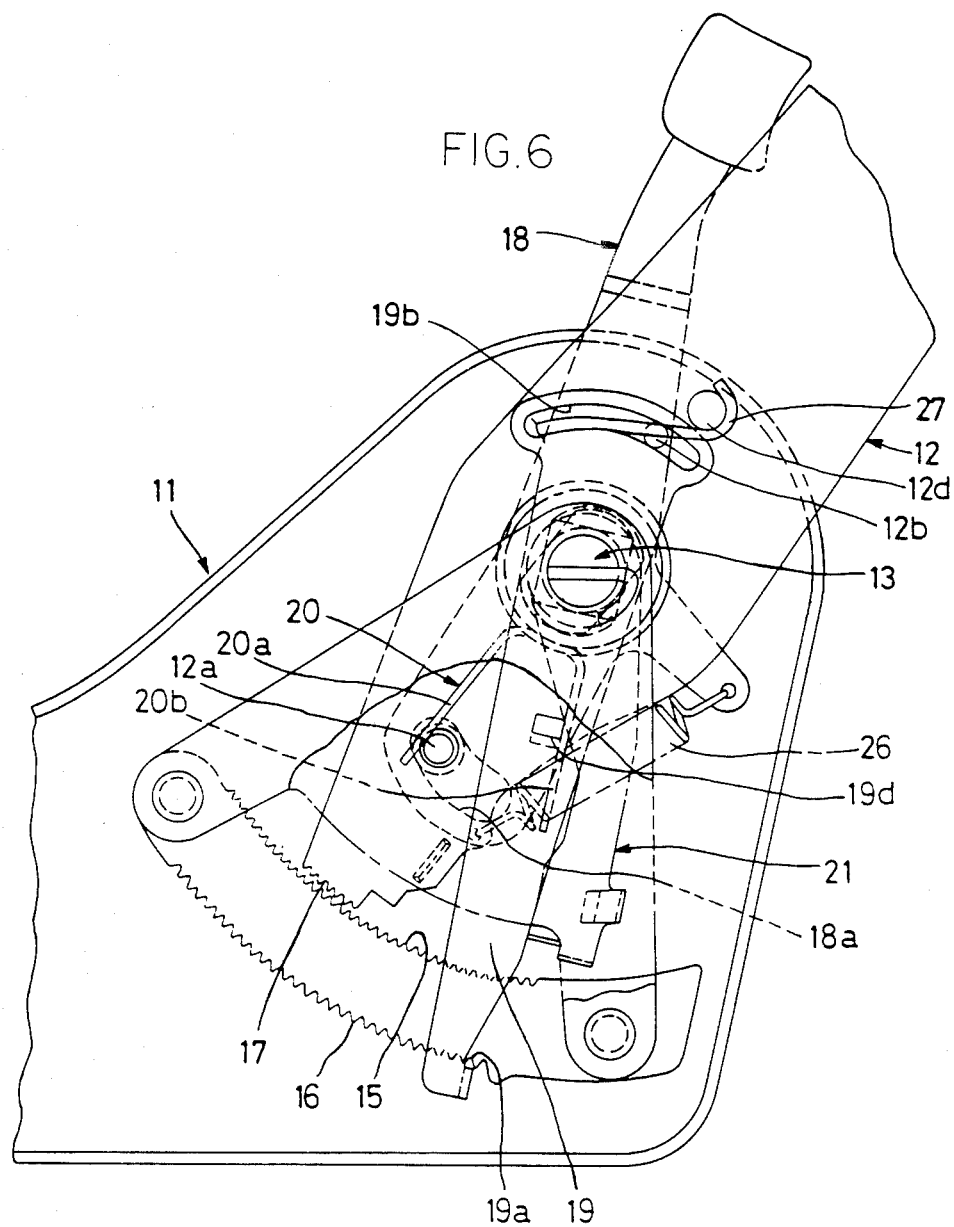

FIXED-ANGLE ADJUSTING MECHANISM

BACKGROUND OF THE INVENTION

The present invention relates to a mechanism for adjusting an angle at which a movable member is fixed to a fixed member, for use on an adjustable-angle seat back, for example, and more particularly to such a fixed-angle adjusting mechanism composed of a fixed member and a movable member angularly movably mounted on the fixed member, the fixed and movable members having a latch member and a pawl member engageable with and disengageable from each other in response to operation of a control lever for adjusting the angle of attachment of the movable member to the fixed member.

Prior fixed-angle adjusting mechanisms of the type described include a fixed member and a movable member angularly adjustably mounted on the fixed member. To set the movable member in a desired angular position with respect to the fixed member, a control handle is first released, then the movable member is angularly moved to the desired position with respect to the fixed member, and finally the movable member is secured to the fixed member. Once the movable member has been turned from a desired position to another position, however, the movable member cannot easily be returned to the desired position. When the movable member is to be restored to the original desired position, efforts should be made to adjust the angular position of the movable member again. Accordingly, the conventional fixed-angle adjusting mechanisms have been tedious and time-consuming in angle adjusting operation.

SUMMARY OF THE INVENTION

It is an object of the present invention to provide a fixed-angle adjusting mechanism having means for memorizing an angular position of a movable member prior to angular movement thereof in response to operation of a control lever.

According to the present invention, a fixed-angle adjusting mechanism comprises a fixed member having a latch member, a movable member angularly movably mounted on the fixed member and having a pawl member engageable with the latch member in a desired angular position, a control lever angularly movably mounted on the fixed member and actuatable for disengaging the pawl member from the latch member, a memory member engageable with the latch member in response to actuation of the control lever, a limiting member angularly movably mounted on the fixed member, and engageable with the pawl member for preventing the latter from engaging the latch member in response to actuation of the control lever and responsive to coaction with the memory member for disengaging from the pawl member, and means acting on the memory member for positioning the latter in an angular position corresponding to the desired angular position.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is an enlarged front elevational view of the fixed-angle adjusting mechanism of the invention;

FIG. 3 is a cross-sectional view taken along line III—III of FIG. 2;

FIG. 4 is an enlarged cross-sectional view taken along line IV—IV of FIG. 2; and FIGS. 5 through 8 are front elevational views showing progressive steps of operation of the fixed-angle adjusting mechanism of the present invention.

DESCRIPTION OF THE PREFERRED EMBODIMENT

Figure 1:
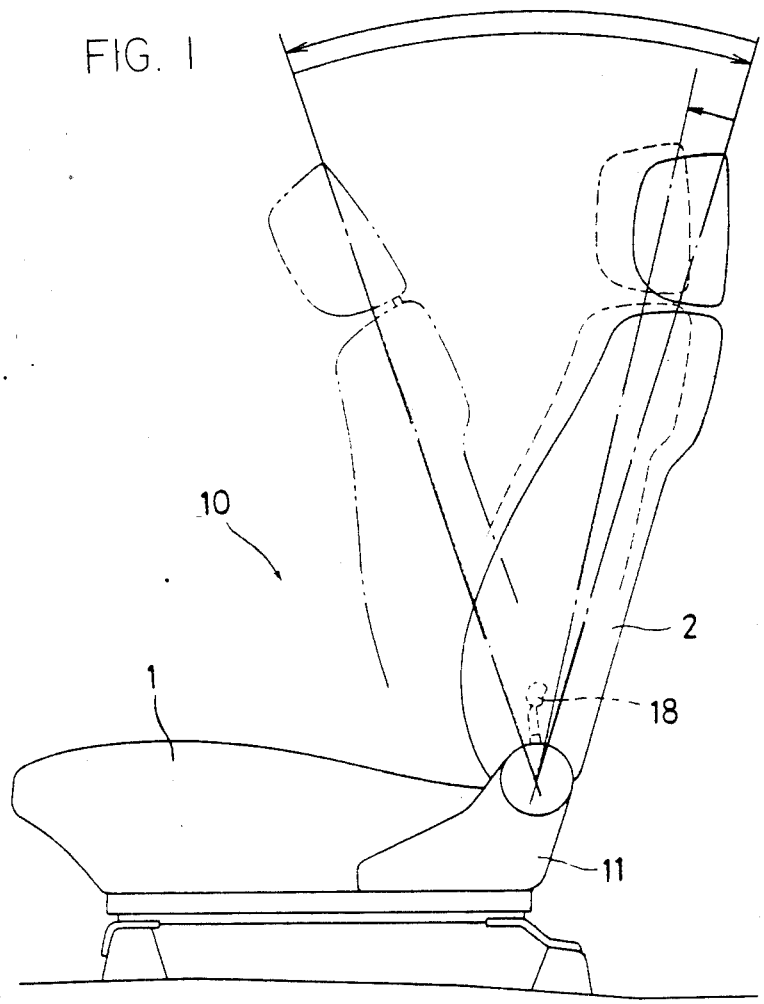
FIG. 1 is a side elevational view of a reclining seat assembly in which a fixed-angle adjusting mechanism of the present invention is incorporated.

The present invention is particularly useful when embodied in a fixed-angle adjusting mechanism incorporated in a reclining seat assembly generally designated by the reference numeral 10 in FIG. 1. The reclining seat assembly 10 comprises a seat cushion 1 having a lower bracket 11 fixed to lateral sides thereof, and a seat back 2 angularly movably mounted on the lower bracket 11. The seat back 2 can be angularly moved with respect to the seat cushion 1 through the fixed-angle adjusting mechanism actuatable by a control lever 18.

The fixed-angle adjusting mechanism will be described with reference to FIGS. 2 through 4.

As shown in FIG. 3, a shaft 13 is secured to the lower bracket 11, which serves as a fixed member. An upper bracket 12 attached as a movable member to the seat back 2 is hinged by the shaft 13 to the lower bracket 11. An arcuate latch member 14 or a ratchet member is mounted on the lower bracket 11 in concentric relation to the shaft 13. The latch member 14 has teeth 15 defined on an inner peripheral edge thereof for adjusting an angle at which the upper bracket 12 is secured to the lower bracket 11, and teeth 16 defined on an outer peripheral edge thereof for memorizing such an angle. The upper bracket 12 has on a lower end (as shown in FIG. 2) a pawl 17 for meshing engagement with the angle adjusting teeth 15. The upper bracket 12 has an oblong hole 14a through which the shaft 13 extends, the oblong hole 14a having a longitudinal axis directed toward the pawl 17 for allowing the latter to disengage from the angle adjusting teeth 15.

As illustrated in FIG. 3, a control lever 18 is angularly movably mounted on the shaft 13 and disposed between the lower and upper brackets 11, 12. A limiting plate 21 and a memory member 19 are also angularly movably mounted on the shaft 13 on one side of the upper bracket 12 remotely from the lower bracket 11, the limiting plate 21 and the memory member 19 being retained on the shaft 13 by a plate 28 positioned by a retaining ring 29.

The control lever 18 has a guide hole 18a defined therein and including a righthand end portion (FIG. 2) extending arcuately about the shaft 18 and a lefthand end portion contiguous to the righthand end portion and inclined toward the shaft 13. An engagement pin 12a is attached to the upper bracket 12 and fitted in the guide hole 18a. The control lever 18 also has an arm 18b. A coil spring 26 is connected between the arm 18b and the pawl 17 of the upper bracket 12 for normally biasing the control lever 18 to turn clockwise as shown in FIG. 2 about the shaft 13. When the control lever 18 is actuated, the engagement pin 12a on the upper bracket 12 is positioned in the righthand arcuate portion of the guide hole 182 in the control lever 18.

The memory member 19 has on a lower end thereof (FIG. 2) a pawl 19a engageable with the angle memorizing pawl 16 on the latch member 14. The memory member 19 also has in an upper end thereof an arcuate slot 19b extending in concentric relation to the shaft 13. A guide pin 12b secured to the upper bracket 12 is fitted in the arcuate slot 19b. The memory member 19 has an oblong hole 19c through which the shaft 13 extends, the oblong hole 19c being oriented toward the pawl 19a for permitting the latter to engage with the angle memorizing teeth 16.

As shown in FIG. 2, the limiting plate 21 has on a distal end thereof an abutment face 24 bent toward the viewer and a holder face 23 bent away from the viewer. The abutment face 24 is held in abutment against a righthand edge 25 (FIG. 4) of the memory member 19, while the holder face 23 is held in engagement with a hook 22 (FIG. 2) on a righthand edge of the upper bracket 12 for thereby preventing the upper bracket 12 from being displaced downwardly. The limiting plate 21 also has a bent portion 21a extending away from the viewer (as shown in FIG. 2) and having a substantially channel-shaped cross section. The bent portion 21a has a projection 21b engageable in a groove 12c defined in the upper bracket 12.

As illustrated in FIG. 3, a return spring 20 is rotatably disposed around the shaft 13 between the upper bracket 12 and the limiting plate 21. The return spring 20 has end portions 20a, 20b sandwiching the engagement pin 12a therebetween. The memory member 19 has a bent engagement portion 19d clamped between the end portions 20a, 20b of the return spring 20. The engagement pin 12a and the engagement portion 19d are therefore held in alignment with each other between the end portions 20a, 20b of the return spring 20. The return spring 20 has a coil portion interposed between the upper bracket 12 and the limiting plate 21 for urging the end portions together.

Between the shaft 13 and the upper bracket 12, there is disposed a spiral spring 27 having one end fixed to a head of the shaft 13 and the other end hooked to a pin 12d affixed to the upper bracket 12. The upper bracket 12 is normally urged by the spiral spring 27 to turn counterclockwise (FIG. 2) about the shaft 13.

Operation of the fixed-angle adjusting mechanism of the foregoing construction is as follows:

The upper bracket 12 is securely attached to the lower bracket 11 in the position shown in FIG. 2. When the control lever 18 is turned counterclockwise, the engagement pin 12a on the upper bracket 12 engages the lefthand end of the guide hole 18a in the control lever 18 whereupon the engagment pin 12a is pushed by the guide hole 18a toward the shaft 13. As shown in FIG. 5, the upper bracket 12 is allowed by the oblong hole 14a to move upwardly until the pawl 17 of the upper bracket 12 is disengaged from the angle adjusting teeth 15 of the latch member 14.

With the upward movement of the upper bracket 12, the memory member 19 having the arcuate slot 19b in which the guide pin 12b on the upper bracket 12 is fitted is allowed by the oblong hole 19c to move upwardly. Therefore, the pawl 19a of the memory member 19 is brought into engagement with the angle memorizing teeth 16 of the latch member 14.

Figure 7:
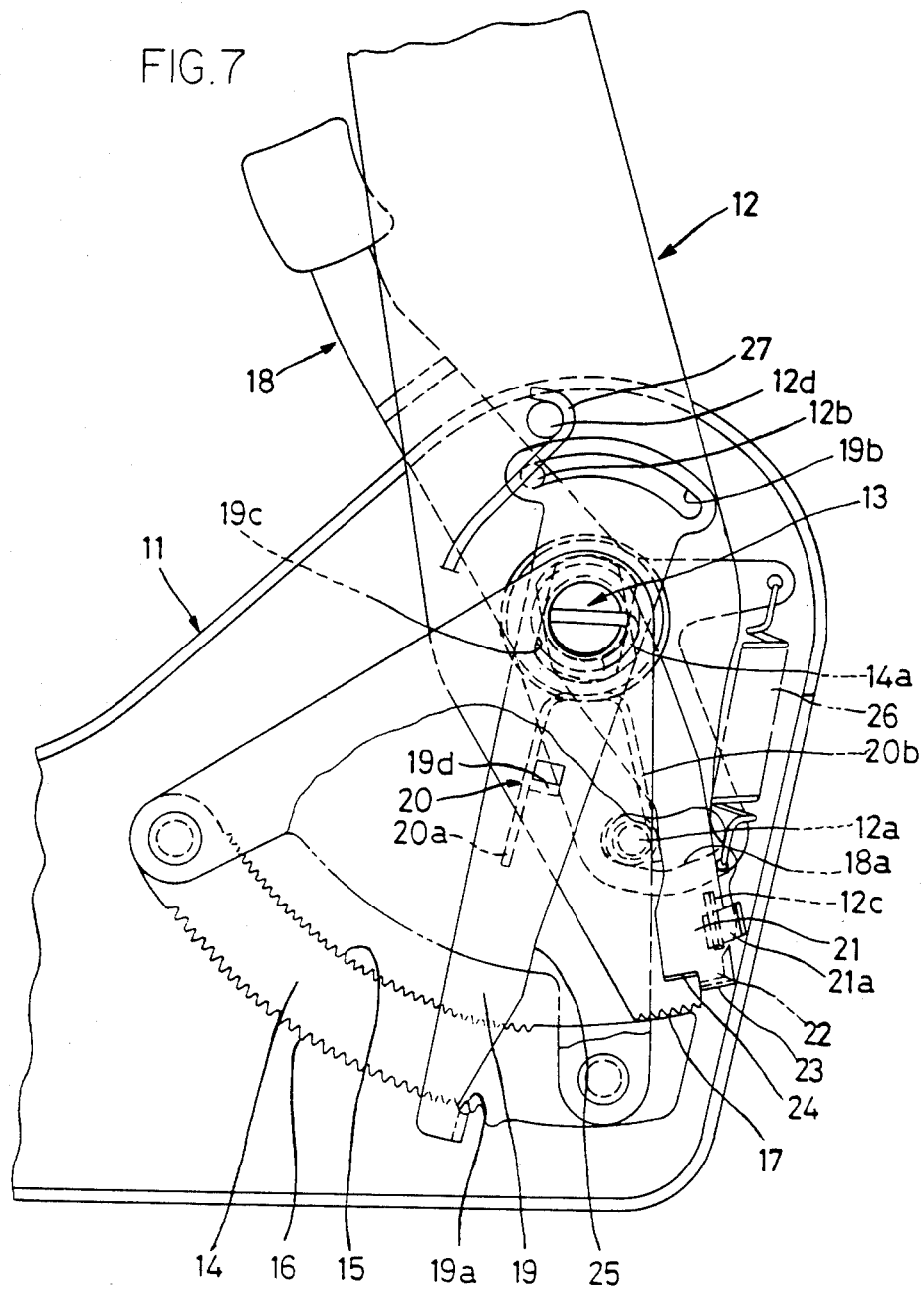

When the pawl 17 is released of meshing engagement with the angle adjusting teeth 15 of the latch member 14, the upper bracket 12 is caused to turn counterclockwise about the shaft 13 under the resilient force of the spiral spring 27 engaging the engagement pin 12d secured to the upper bracket 12. As depicted in FIG. 7, the upper bracket 12 is brought into abutment against the limiting plate 21, and turned therewith until a side edge of the limiting plate 21 abuts against an inner surface of the lower bracket 12.

At this time, the hook 22 of the upper bracket 12 enters behind the holder face 23 into the bent portion 21a. The projection 21b of the bent portion 21a now engages in the groove 12c in the upper bracket 12, whereupon the upper bracket 12 and the limiting plate 21 are joined together. After the control lever 18 is released, therefore, the upper bracket 12 is prevented from moving back downwardly because of the engagement of the hook 22 with the holder face 23. The control lever 18 is held in the position of FIG. 7, and the pawl 19a of the memory member 19 is kept in meshing engagement with the angle memorizing teeth of the latch member 14.

Thereafter, an upper end portion of the upper bracket 12 is turned clockwise against the biasing force of the spiral spring 27. The limiting plate 21 is also angularly moved clockwise in unison with the upper bracket 12. When the abutment face 24 of the limiting plate 21 abuts against the righthand edge 25 of the memory member 19, only the upper bracket 12 is allowed to turn clockwise further. The projection 21b of the limiting plate 21 is disengaged from the groove 12c in the upper bracket 12, and the hook 22 of the upper bracket 12 is released from the holder face 23 of the limiting plate 21. Therefore, the upper plate 12 is now rendered movable downwardly as shown in FIG. 5.

At this time, the control lever 18 is also turned clockwise about the shaft 13 under the resiliency of the coil spring 26. When the engagement pin 12a fits into the righthand end of the guide hole 18a, the upper bracket 12 is moved downwardly. Simultaneously, the memory member 19 is also displaced downwardly by the guide pin 12b attached to the upper bracket 12. The pawl 17 of the upper bracket 12 is brought into meshing engagement with the angle adjusting teeth 15, and the pawl 19a of the memory member 19 is disengaged from the angle memorizing teeth 16 of the latch member 14.

Operation for adjusting the position in which the upper bracket 12 is fixed to the lower bracket 11 will be described with reference to FIGS. 2, 6 and 8. When the control lever 18 is turned counterclockwise in FIG. 2, the pawl 17 of the upper bracket 12 is disengaged from the angle adjusting teeth 15 of the latch member 14, as described above. At the same time, the pawl 19a of the memory member 19 comes into meshing engagement with the angle memorizing teeth 16 of the latch member 14.

The upper bracket 12 is now turned clockwise against the biasing force of the spiral spring 27 acting on the upper bracket 12. When the upper bracket 12 has turned to a desired position, for example the position of FIG. 6, the control lever 18 is released. The control lever 18 is then allowed to turn clockwise about the shaft 13 under the force of the coil spring 26 until the engagement pin 12a engages the righthand end of the guide hole 18a. The engagement pin 12a is caused to moved downwardly, whereupon the upper bracket 12 is also moved downwardly. The memory member 19 is also displaced downwardly by the guide pin 12b. The pawl of the upper bracket 12 now engages the angle adjusting teeth 15 of the latch member 14 in a desired position, as shown in FIG. 8. Concurrent with this, the pawl 19a of the memory member 19 is released from the meshing engagement with the angle memorizing teeth 16 of the latch member 14.

As the upper bracket 12 turned clockwise as shown in FIG. 6, the return spring 20 is caused to spread since the end 20a thereof is angularly displaced by the engagement pin 12a of the upper bracket 12. Therefore, the other end 20b of the return spring 20 abutting against the engagement portion 19d of the memory member 19 urges the latter toward the end 20a of the return spring 10. Upon disengagement of the pawl 19a of the memory member 19 from the angle memorizing teeth 16, the memory member 19 immediately turns clockwise under the biasing force of the return spring 20 until the engagement pin 12a is sandwiched between the ends 20a, 20b of the return spring 20. Accordingly, the memory member 19 as it is released from the latch member 14 follows the upper bracket 12 no matter where it may be positioned. The memory function of the memory member 19 is not impaired by any change in the angular position of the upper bracket 12 with respect to the lower bracket 11.

Figure 8:
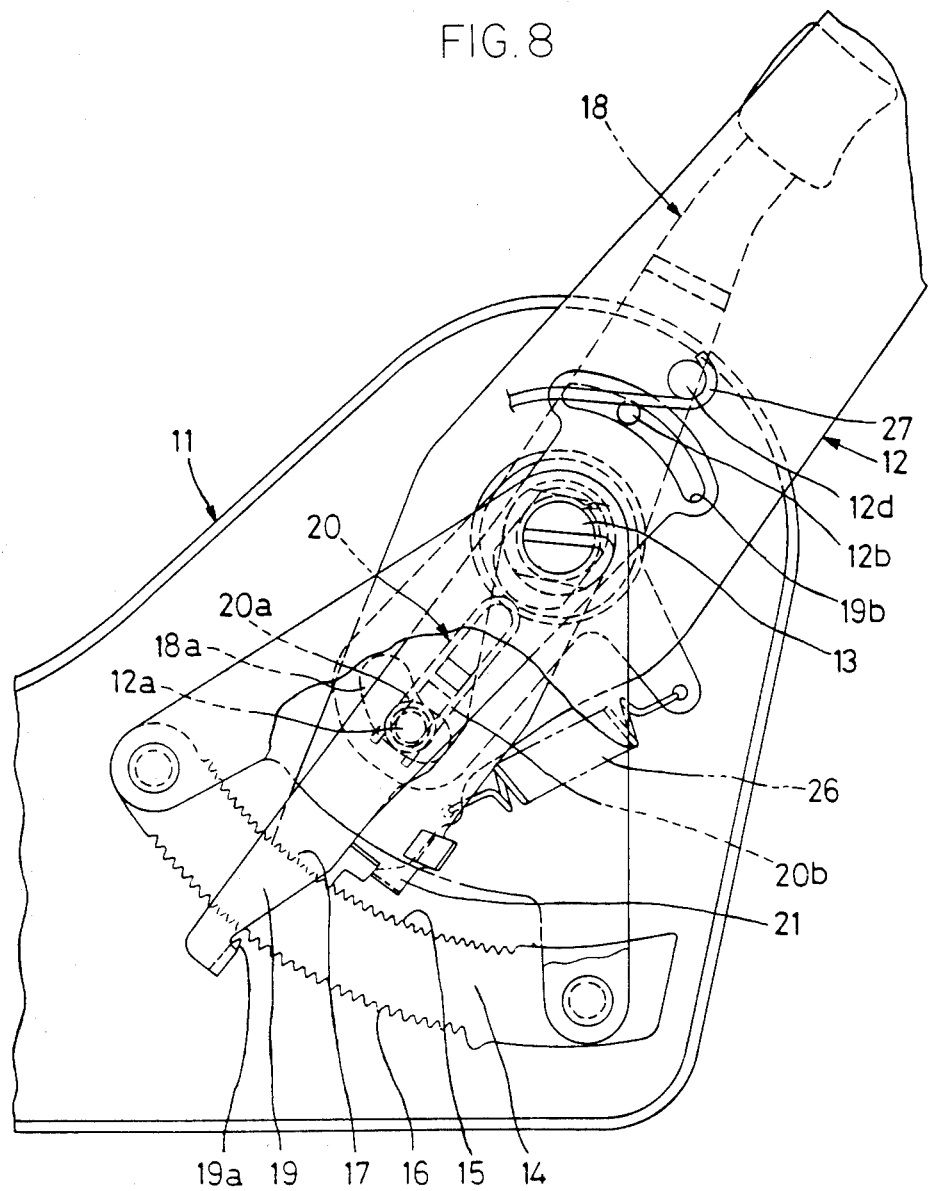

The upper bracket 12 can be angularly displaced counterclockwise, for example from the position of FIG. 8 to the position of FIG. 2. When the control lever 18 is actuated, the pawl 17 disengages from the angle adjusting teeth 15, and the pawl 19a engages wth angle memorizing teeth 16. The upper bracket 12 is urged by the spiral spring 27 to turn counterclockwise about the shaft 13. The upper bracket 12 is then allowed to turn gradually counterclockwise under the biasing force of the spiral spring 27 until the upper bracket 12 reaches the position of FIG. 2.

When the control lever 18 is released, the pawl 17 is brought into mesh with the angle adjusting teeth 15 as illustrated in FIG. 2. Simultaneously, the pawl 19a of the memory member 19 which has remained in the position of FIG. 8 is disengaged from the angle memorizing teeth 16. The return spring 20 has been spread by the engagement pin 12a engaging the end 20b of the return spring 20 in the counterclockwise movement of the upper bracket 12. Therefore, the memory member 19 is also angularly moved from the position of FIG. 8 to the position of FIG. 2 under the bias of the return spring 20 with its end 20a engaging the engagement portion 19d of the memory member 19.

The upper bracket 12 can be angularly adjusted either clockwise or counterclockwise with respect to the lower bracket as described above.

The fixed-angle adjusting mechanism of the foregoing arrangement is incorporated in the reclining seat assembly 10 illustrated in FIG. 1. By turning the control lever 18 counterclockwise, the seat back 2 can be angularly moved to and kept in a front inclined position as indicated by the two-dot-and-dash line in FIG. 1. When the seat back 2 is turned clockwise, it can be fixed in the original position. The seat back 2 can be fixed in a desired angular position as shown in the broken line (FIG. 1), for example, by first actuating the control lever 18, moving the seat back 2 to the desired position, and then releasing the control lever 18.

The seat assembly 10 thus constructed is particularly useful when mounted as a front seat on automobiles such as two-door automobiles. After the seat back 2 has been inclined to a front position to allow a piece of baggage to be placed on a rear seat or a passenger to get on to the rear seat, the seat back 2 can easily be returned to the original angular position which has been set previously. The fixed position of the seat back 2 with respect to the seat cushion 1 can be adjusted by actuating the control lever 18.

The arrangement of the present invention is simple in structure such that it can be incorporated in prior fixed-angle adjusting mechanisms to provide the latter with an angle memory function.

Although a certain preferred embodiment has been shown and described, it should be understood that many changes and modifications may be made therein without departing from the scope of the appended claims. For example, the fixed-angle adjusting mechanism of the present invention can be incorporated in other devices than automobile seat assemblies.

What is claimed is:

1. A fixed-angle adjusting mechanism comprising:
   (a) a fixed member having a latch member;
   (b) a movable member angularly movably mounted on said fixed member and having a pawl member engageable with said latch member in a desired angular position;
   (c) a control lever angularly movably mounted on said fixed member and actuatable for disengaging said pawl member from said latch member;
   (d) a memory member engageable with said latch member in response to actuation of said control lever;
   (e) a limiting member angularly movably mounted on said fixed member, and engageable with said pawl member for preventing the latter from engaging said latch member in response to actuation of said control lever and responsive to coaction with said memory member for disengaging from said pawl member; and
   (f) means acting on said memory member for positioning the latter in an angular position corresponding to said desired angular position.

2. A fixed-angle adjusting mechanism according to claim 1, wherein said memory member has a second pawl member actuatable into engagement with said latch member in response to actuation of said control lever.

3. A fixed-angle adjusting mechanism according to claim 2, wherein said memory member is pivotably mounted on one of said first-mentioned pawl member, said fixed member, and said movable member, and angularly movable relatively to said movable member.

4. A fixed-angle adjusting mechanism according to claim 3, wherein said means comprises a resilient member interposed between said memory member and said first-mentioned pawl member.

5. A fixed-angle adjusting mechanism according to claim 2, including first cam means disposed between said control lever and said first-mentioned pawl member for bringing the latter into and out of engagement with said latch member, and second cam means disposed between said first-mentioned pawl member and said memory member for bringing said memory member into and out of engagement with said latch member.

6. A fixed-angle adjusting mechanism according to claim 5, wherein said first cam means comprises an engagement pin mounted on said movable member and a guide hole defined in said control lever and receiving therein said engagement pin, said latch member having first teeth engageable with said first-mentioned pawl member and second teeth engageable with said second pawl member.

* * * * *